(12) United States Patent
Soderholm et al.

(10) Patent No.: US 12,375,518 B1
(45) Date of Patent: *Jul. 29, 2025

(54) INTELLIGENT SEARCH NETWORK FOR TIME-BASED DETECTION OF COMPROMISED NETWORK NODES

(71) Applicant: U.S. Bancorp, National Association, Minneapolis, MN (US)

(72) Inventors: Elise C. Soderholm, Eagan, MN (US); Sarah Margaret Bettendorf Larson, Clearwater, MN (US); Adam Michael Tangen, Minneapolis, MN (US); Christopher Kallas, Grafton, WI (US); Xiaoqiao Wei, Rancho Mission Viejo, CA (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/196,527

(22) Filed: May 1, 2025

Related U.S. Application Data

(63) Continuation of application No. 19/040,705, filed on Jan. 29, 2025, now Pat. No. 12,316,664.

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC .......................... H04L 63/1425; H04L 63/1416
USPC .......................................................... 726/23
See application file for complete search history.

(56) References Cited

U.S. PATENT DOCUMENTS

| | | | |
|---|---|---|---|
| 11,468,447 B2 * | 10/2022 | Kallas | G06F 21/57 |
| 11,941,633 B2 | 3/2024 | Kallas et al. | |
| 2016/0381068 A1 * | 12/2016 | Galula | G07C 5/0816 |
| | | | 726/23 |
| 2018/0293713 A1 | 10/2018 | Vogels et al. | |
| 2019/0095988 A1 * | 3/2019 | Zoldi | G06Q 40/00 |
| 2020/0074471 A1 * | 3/2020 | Adjaoute | G06Q 40/12 |
| 2020/0211022 A1 * | 7/2020 | Allbright | H04L 63/1408 |
| 2022/0164699 A1 * | 5/2022 | Neupane | G06Q 20/405 |
| 2022/0269258 A1 * | 8/2022 | Yang | G05B 23/0281 |
| 2022/0330027 A1 * | 10/2022 | Djukic | H04W 12/122 |
| 2024/0338704 A1 | 10/2024 | Kallas et al. | |

* cited by examiner

*Primary Examiner* — Badri Narayanan Champakesan
(74) *Attorney, Agent, or Firm* — FOLEY & LARDNER LLP

(57) ABSTRACT

A method and related systems for isolating compromised edge nodes in a computing device network based on tracking event patterns in off-network data by obtaining an anomaly indication for an event type associated with a set of event participant identifiers indicated by temporal sequences for a network. Some embodiments may determine a set of compromised nodes based on the events of the event type and restrict or apply a monitoring filter to traffic for the set of compromised nodes.

26 Claims, 5 Drawing Sheets

INTELLIGENT SEARCH NETWORK FOR TIME-BASED DETECTION OF COMPROMISED NETWORK NODES

CROSS-REFERENCE TO RELATED APPLICATION(S)

This application is a Continuation of and claims the benefit of priority to U.S. patent application Ser. No. 19/040,705, filed Jan. 29, 2025, the entire disclosure of which is incorporated herein by reference in its entirety and for all purposes.

BACKGROUND

Network vulnerability detection is an important security practice and may involve examining devices connected to a network. The process helps identify potential security weaknesses, misconfigurations, or outdated software that attackers might exploit. Such operations may also reveal unauthorized devices and unpatched systems. A computer system may then use this information to initiate countermeasures that address these vulnerabilities, such as by isolating the affected device or network segment to prevent the threat from spreading.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 illustrates an example machine learning framework that techniques described herein may benefit from.

DETAILED DESCRIPTION

Figure 1:
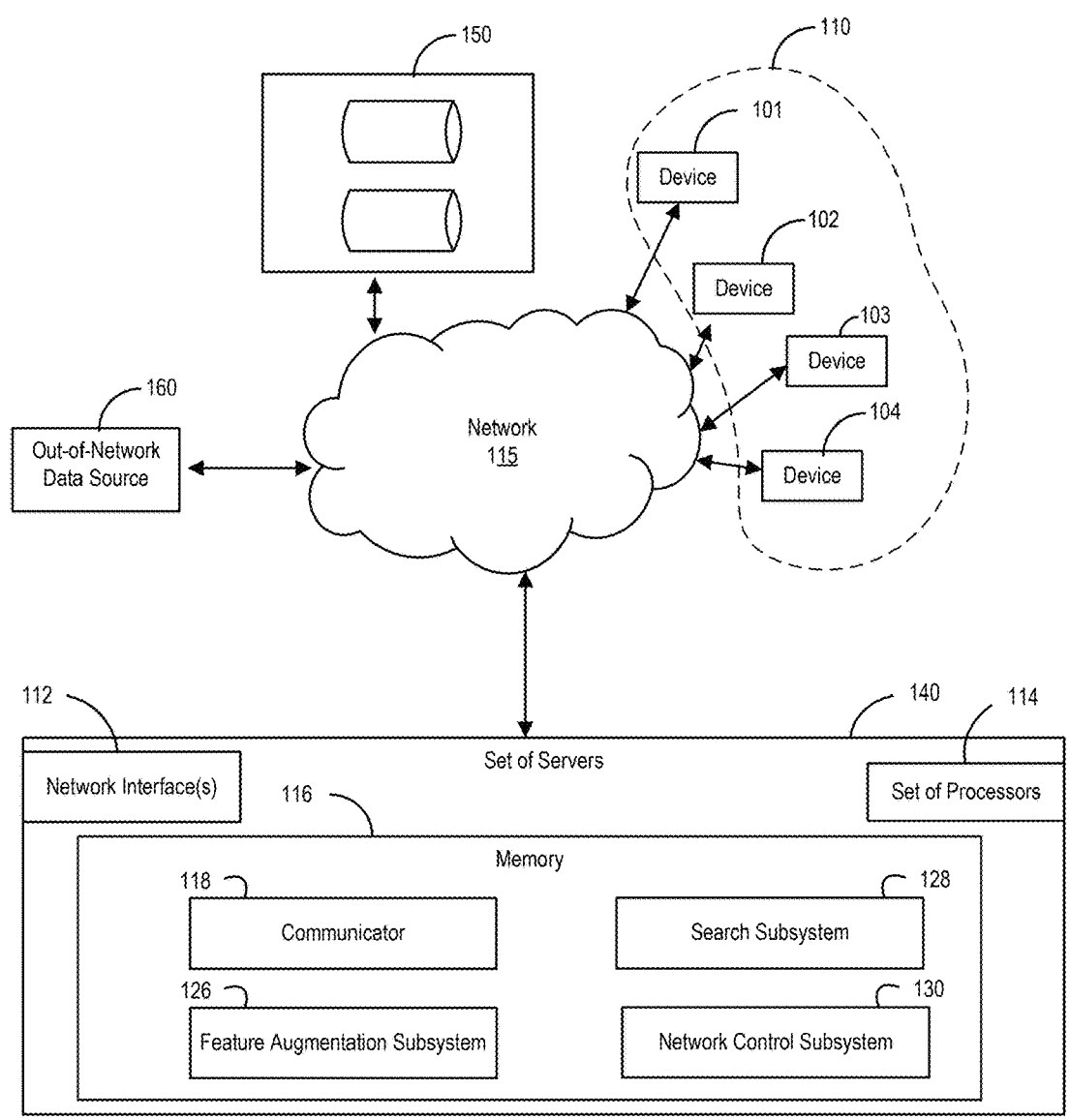
FIG. 1 is an illustration of an example conceptual diagram for detecting points of compromise using time-based methods, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and part of this disclosure.

Compromised devices represent severe risks to a network, as they can be used to repeatedly create new vulnerabilities without any overt or even knowing action by device users. In the context of point of compromise (POC) detection for compromised nodes, the relationship between the input data (such as network traffic or system logs) and the output results (such as detected incidents) is not straightforward. The complexity may be caused by temporal gaps between when incidents occur and when incidents are detected. In many cases, these temporal gaps are exacerbated by the time blocks selected to report incidences, such as when an incident that occurs in one day will not be reported for one or more months due to both detection and batch reporting cycles. As a result, incidents are often reported by external network providers or identified through in-house monitoring systems long after they have already occurred. This delay impairs operations to detect relations between input data, the detected incidents, and compromised nodes. Moreover, these delays may be intended by malicious agents that recognize the advantages of delaying the use of information retrieved from compromised devices.

Some embodiments may overcome these and other issues by taking advantage of rate gradients for event types. Some embodiments may obtain an anomaly indication for an event type associated with a set of event participant identifiers indicated by temporal sequences for a network from an out-of-network data source. For example, some embodiments may obtain an indication that a defined user group is compromised and, in response, receive a message history or other type of event history identifying users of this defined user group. Some embodiments may then generate sets of event rate gradients associated with sets of time blocks based on event rates for events of the event type indicated by the temporal sequences. For example, some embodiments may determine the acceleration in the rate at which messages sent by users of this defined user group are provided by edge devices in a computer network.

Some embodiments may then find a set of compromised nodes by selecting a set of time blocks for which an associated set of event rate gradients falls below an acceleration threshold to identify a set of candidates compromised nodes. For example, some embodiments may find that the messaging rate of potentially compromised users at a node falls off at approximately the seven-month mark, indicating that this is the point at which the node may be compromised. Some embodiments may then determine an expanded time window based on the earliest time block of the set of candidate compromised nodes, where the earliest time block satisfies an event rate threshold and a geographic-based criteria. For example, the embodiments may determine that a time block for a node's event history representing the eight-month mark for an event is the earliest time block based on a determination that the node demonstrates at least a 10% rate of message activity for flagged users and is within the same geographic location as at least one other candidate device.

Some embodiments may then perform a search through the temporal sequences representing an event history based on the expanded time window and the event type to obtain the set of compromised nodes. For example, if an expanded time window is set to eight months, some embodiments may search through multiple message histories or other historical data or going back up to eight months, where the search is greater than zero. Some embodiments may then secure the detected compromised nodes by restricting the compromised nodes' access to the network or otherwise applying a monitoring filter to traffic involving the set of compromised nodes. By dynamically adjusting the time windows used to detect compromised nodes, some embodiments may account for a malicious actor's attempts to hide or obfuscate compromised nodes by simply waiting for a duration designed to exceed a default time window used in a search. Furthermore, some embodiments may use other operations described in this disclosure to detect and isolate potentially compromised nodes and reduce the number of the security vulnerabilities to a network.

In brief overview, the system 100 can include a set of servers 140. The set of servers 140 can be configured to store and process various types of data, such as data from a set of devices 110 that includes a first device 101, a second device 102, a third device 103, or a fourth device 104. The set of servers 140 may perform one or more operations described in this disclosure. For example, the set of servers 140 can detect point of compromise devices amongst the set of devices 110 based on data stored in or updated in a set of databases 150. The set of servers 140, the set of devices 110, the set of databases 150, and an out-of-network data source 160 can communicate over a network 115. The system 100 may include more, fewer, or different components than shown in FIG. 1.

The set of servers 140 or the set of devices 110 can include or execute on one or more processors or computing devices or communicate via the network 115. The network 115 can include computer networks such as the Internet, local, wide, metro, or other area networks, intranets, satellite networks, and other communication networks such as voice or data mobile telephone networks. The network 115 can be used to access information resources such as web pages, websites, domain names, or uniform resource locators that can be presented, output, rendered, or displayed on at least one computing device (e.g., the set of servers 140, the set of devices 110, etc.), such as a laptop, desktop, tablet, personal digital assistant, smartphone, portable computer, or speaker.

The set of servers 140, the set of devices 110, or another computer system described in this disclosure can include or utilize at least one processing unit or other logic devices such as a programmable logic array engine or a module configured to communicate with one another or other resources or databases to perform one or more of the operations described in this disclosure. As described herein, computers can be described as computers, computing devices, or client devices. The set of servers 140 or the set of devices 110 may each contain a processor and a memory. The components of the set of servers 140, the set of devices 110, or another computer system described in this disclosure can be separate components or a single component. The system 100 and its components can include hardware elements, such as one or more processors, logic devices, or circuits.

The set of servers 140 can be or include a server or computer that is configured to store various types of data, such as data stream data, image data, audio data, other types of content data, etc. For example, the set of servers 140 can store database transaction records for different accounts in memory (e.g., in a database in memory).

The set of servers 140 may include one or more processors that are configured to monitor network traffic and retrieve additional data from the out-of-network data source 160 indicating a set of flagged operations, flagged accounts, flagged devices, etc. that a user can use to add contextual data for a transaction to a record of transaction data that the set of servers 140 stores for the transaction. A set of flags may indicate various types of information about a message, an account record involved in a message, a database transaction, an account record involved in a database transaction, a node, an account record used to access information via the node, etc. For example, some embodiments may receive an internal flag "int_flag" from an internal data system (e.g., the set of databases 150) and receive an external flag "ext_flag" from an external data system (e.g., the out-of-network data source 160). Some embodiments may also obtain other features that may be used to define or characterize an event type used to label one or more events, such as a date difference between the latest transaction and the current date or a date range between the earliest and latest transactions. Additionally, the number of cards labeled with int_flag and transacted at the merchant in the past six months, as well as the number of cards labeled with ext_flag and transacted at the merchant in the same period, may be used as input features. Furthermore, some embodiments may use the number of cards labeled with both int_flag and ext_flag during the same monitoring period, the number of cards labeled with either int_flag or ext_flag during the same period, or the number of transactions with an amount less than or equal to $1.00 as event type-characterizing features used to label one or more events. Some embodiments may use the number of declined transactions in the past six months, the number of reversed transactions at the merchant in the same timeframe, or the number of fraud transactions prior to an int_flag assignment as features. Some embodiments may use the number of transactions with address verification or the number of transactions where the tokens of the account number were masked to characterize an event type used to label one or more events.

One or more computer devices of the set of servers 140 may include a network interface 112, a set of processors 114, and/or memory 116. The one or more computer devices of the set of servers 140 may communicate with the set of servers 140 via the network interface 112, which may be or include an antenna or other network device that enables communication across a network and/or with other devices. The set of processors 114 may be or include an ASIC, one or more FPGAs, a DSP, circuits containing one or more processing components, circuitry for supporting a microprocessor, a group of processing components, or other suitable electronic processing components. In some embodiments, the set of processors 114 may execute computer code or modules (e.g., executable code, object code, source code, script code, machine code, etc.) stored in memory 116 to facilitate the operations described herein. The memory 116 may be any volatile or non-volatile computer-readable storage medium capable of storing data or computer code.

The communicator 118 may include program instructions that, upon execution, cause the set of processors 114 to communicate with the set of devices 110, the set of databases 150, the out-of-network data source 160, or any other computing device. The communicator 118 may be or include an application programming interface (API) that facilitates communication between the set of servers 140 (e.g., via the network interface 112) and other computing devices. For example, the communicator 118 can establish a connection between the set of servers 140 and the out-of-network data source 160 (or another computer system) over the network 115. In one example, the communicator 118 can transmit a SYN packet to the out-of-network data source 160 or the set of databases 150 and establish the connection using a TLS handshaking protocol. The communicator 118 can use any handshaking protocol to establish a connection with the set of servers 140.

The memory 116 may store program instructions that, upon execution, cause the set of processors 114 to perform one or more operations described in this disclosure, such as executing one or more operations described for a feature augmentation subsystem 126, a search subsystem 128, or a network control subsystem 130.

In some embodiments, the set of servers 140 may use a communicator 118 to obtain information from the set of databases 150 or the out-of-network data source 160 that indicates an event type for investigation. For example, the set of servers 140 may receive a malicious anomaly indication that is associated with an event type corresponding with a set of event participants. For example, the set of servers 140 may receive an event type corresponding with a set of event participant identifiers that includes a first event participant identifier "XYZ01," a second event participant identifier "XYZ02," and the third event participant identifier "XYZ03." These event participant identifiers may identify entities that participated in various types of communications with a network, where records of such communications may be stored as including or part of temporal sequences corresponding with the network. In some embodiments, a temporal sequence may indicate a subset of events for each respective device of the set of devices 110, or each respective device of the set of devices 110 may represent an edge node of the network 115.

Some embodiments may determine additional features from initial feature data stored in the set of databases 150 or provided by the out-of-network data source 160. For example, some embodiments may count the number of events of an event type for each respective edge node of a set of edge nodes for a network. Some embodiments may use these counts of events to determine event rates and use these event rates as another feature used to augment a feature set for detecting possible points of compromise. Furthermore, some embodiments may determine gradients of these event rates with respect to time (e.g., as event acceleration values) or another dimension, where such event rate gradients may be used as another type of feature used to augment a set of features for detecting points of compromise. For example, some embodiments may determine, for each respective temporal sequence representing a history of events, a corresponding respective set of event rates, and a corresponding respective set of event rate gradients with respect to time (e.g., event acceleration values). Some embodiments may repeat this operation for each available time block to generate sets of event rate gradients. For example, some embodiments may determine, for each respective time block of a respective set of time blocks in a respective sequence of the temporal sequences representing events related to a set of nodes, a respective event rate gradient.

In some embodiments, the search subsystem 128 may search for compromised nodes in multiple stages. For example, some embodiments may use the search subsystem 128 to determine a set of candidate compromised nodes based on a first set of time-based criteria and then filter the set of candidate compromised nodes based on other criteria, such as criteria based on geographical data. The application of such stages of searches may help address the complexities involved in detecting one or more points of compromise for a network. In some embodiments, one complexity in detecting a point of compromise is that, after detection of a possibly compromised account or participant identifier, the account or participant identifier may be found as engaging in database transactions or other types of events at multiple edge nodes. For example, a user may enter their login information at a first network edge node at a first time and then enter their login information at a second network edge node at a second time. Even if the first edge node is compromised while the second edge node is not compromised, both transactions may indicate the identity of this user, making it difficult to detect which of the two edge nodes is actually compromised after the user identity is shown to have been compromised at some time in the future.

To address this concern, some embodiments may use events in aggregate over a period of time or multiple periods of time, where changes in the number of events involving compromised accounts over a period of time may be used to detect one or more points of compromise. For example, some embodiments may classify each event with a particular event type, where the particular event type applies to any event in which a flagged identifier is indicated for that event. Some embodiments may then use the events of that event type as features or values used to determine features useful for detecting points of compromise. By using these event types, which capture events driven by multiple accounts, the points of compromise that are responsible for multiple vulnerabilities are more likely to be detected.

Some embodiments may determine a set of time blocks for event rates or event rate gradients and then use the change in the event rate gradients to select one or more nodes to classify as a candidate compromised node. For example, some embodiments may detect a set of time blocks for which the event rate gradients of a set of sequences that fall below an acceleration threshold. By detecting event rate gradients that fall below a threshold, some embodiments may track the change in a number of database transactions or other events that include or are otherwise associated with compromised identifiers or accounts. The trajectory of an event rate or rate gradient may indicate the likelihood of a particular device becoming a point of compromise, where an expectation is that the rate of receiving transaction requests for compromised identifiers of entities or acceleration of such events may indicate which device is actually compromised. For example, a device that is compromised may show a sudden increase in the number of compromised identifiers used to effectuate a database transaction at a particular time point. In some embodiments, the use of a rate gradient representing acceleration in an event may be more effective than the use of a gradient.

Some embodiments may take advantage of the aggregated phenomenon of acceleration in events of a flagged event type to determine the earliest time block in which any node in a set of edge nodes shows acceleration or acceleration beyond an acceleration threshold. For example, some embodiments may use the search subsystem 128 for detecting that the first device 101, the second device 102, the third device 103, and the fourth device 104 may each have been used to effectuate events of one or more flagged event types. Some embodiments may then determine a rate at which such events occurred, where the rate may either count the number of total events involving the use of a flagged event type or reduce the number of occurrences for a particular flagged account to a single event. For example, a flagged event type may include an event involving a particular flagged user account, and the first device 101 may have been used to effectuate five database transactions involving the black account. Some embodiments may use each of the five database transactions as separate events. Alternatively, some embodiments may treat all five database transactions as a single event and count these five database transactions as only one single event. Furthermore, some embodiments may treat an event as an ongoing occurrence for a particular device. For example, the first device 101 may receive a request involving a compromised account during a first measured time interval and receive no requests involving the compromised account during a second measured time interval. Some embodiments may treat the occurrence of an event as a permanent event. For example, some embodiments may receive a request during a first time interval and continue to count this request as an event in a second time interval. In some embodiments, this event may be treated as long-lasting but not permanent, where the effect of the event on an event count may be removed after a duration threshold is satisfied.

Some embodiments may then filter the set of candidate compromised nodes based on additional shared categories associated with the set of candidate compromised nodes. For example, some embodiments may filter a set of candidate compromised nodes by a shared geographic identifier such that nodes sharing geographic identifiers are used. The use of a shared geographic region as a filtering characteristic may be useful in cases where multiple devices within a geographic area are compromised. In many cases, compromised devices within a geographic area may include both the first device to show an accelerated number of transactions or other types of events involving compromised accounts. These compromise devices may also include other devices within the same geographic region, where groups may have worked to compromise multiple devices in that same geographic region. For example, some embodiments may select the first device 101 as a candidate node. Some embodiments may then determine that the second device 102 is within the same geographic region as the first device 101. Some embodiments may then select both the first device 101 and the second device 102 as possible compromised nodes.

Some embodiments may perform searches through multiple temporal sequences indicating events related to different devices to determine compromised nodes. In many cases, a network node may have a very long history, making a search through the entirety of an event history for a device to be laborious. Such searches may use time-based filters to become more efficient and viable for real-world scenarios involving multiple devices across multiple geographic locations. However, some embodiments may modify the time-based filter to better capture intentional delays made to evade detection.

In the context of performing searches, some embodiments may modify a time window used to filter the search based on a selected time block. For example, some embodiments may have an initial time window equal to six months. When searching for a candidate node to investigate as a point of compromise, some embodiments may modify this initial time window to a new value. For example, some embodiments may determine an expanded time window that ranges from a present time of detection or a present time of a search to the earliest time block in which a rate gradient exceeds an acceleration threshold. Alternatively, some embodiments may modify the time window to an expanded time window that starts at a time corresponding with the earliest observation point for a device in the same geographic range as the device having the earliest time window. For example, some embodiments may determine that the first device 101 has an event history for which the earliest time block in which a corresponding event rate gradient for events of a flagged event type exceeds an acceleration threshold. Some embodiments may then determine that the second device 102 satisfies a set of expanded observation criteria by being (1) within the same geographic region as the first device 101 and (2) having an event rate for an event of the flagged event type that exceeds an event rate threshold. For example, the first device 101 may be initially set to a candidate compromised device, where the candidate compromised device is found to have the earliest time block that exceeds an acceleration threshold, where the earliest time block is set to include events within the month of March 2XXX. The second device 102 may have an event rate equal to 47 events for an earlier time block "February 2XXX" and 53 for an even earlier time block "January 2XXX. If a corresponding flagged event rate threshold is equal to 50, some embodiments may then select "Feb. 1, 2XXX" as the earliest date for an expanded time window.

Some embodiments may then perform a search through a database to obtain a set of compromised devices, where a database of temporal sequences for different nodes is based on an expanded time window. For example, after expanding a time window to eight months, some embodiments may search for occurrences of events of a flagged event type within an eight-month period. By expanding a time window, some embodiments may account for idiosyncrasies or intentional attempts at obfuscation by delaying behaviors associated with malicious activity. For example, if a malicious entity began using compromised account information eight months after harvesting them, and use this waiting interval, some embodiments that rely on only a six-month search period may miss evidence of a compromised device.

Some embodiments may account for such issues by making changes to the way a network operates or is monitored using a network control subsystem 130. For example, some embodiments may use the network control subsystem 130 to restrict network access for one or more nodes that are determined to be part of a set of compromised nodes. For example, some embodiments may use the operations described in this disclosure to select the first device 101 and the second device 102 as being part of a set of compromised nodes. In response, some embodiments may then restrict network access to the network 115 alternatively, or additionally, some embodiments may apply a monitoring filter to message traffic coming from the set of compromise devices. By doing so, some embodiments may isolate compromised edge nodes and prevent further network vulnerabilities from propagating.

Figure 2:
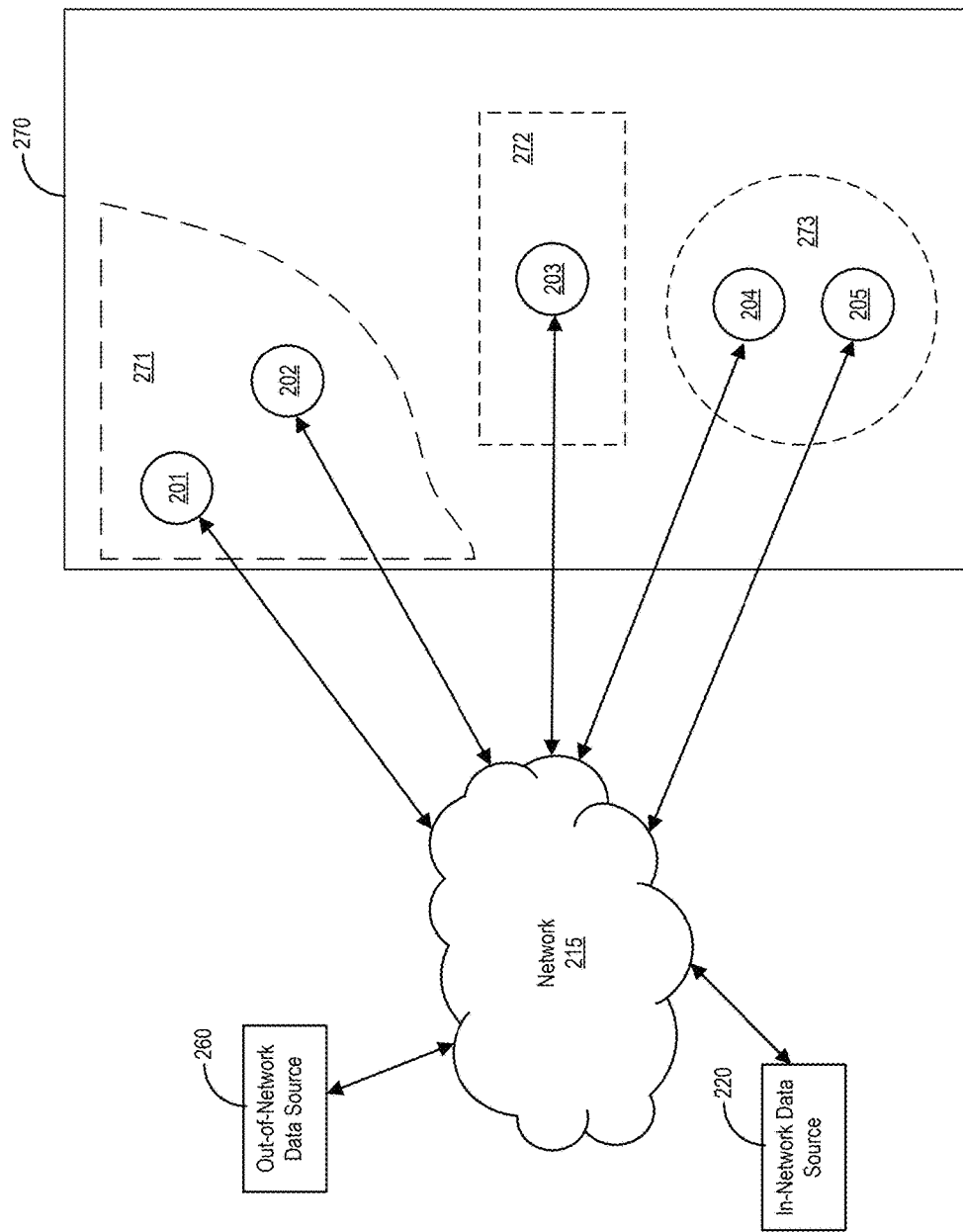
FIG. 2 is an illustration of an example conceptual structure for detecting points of compromise using time-based methods, in accordance with an implementation.

FIG. 2 is an illustration of an example conceptual structure for detecting points of compromise using time-based methods, in accordance with an implementation. A network 215 includes a first edge node 201, a second edge node 202, a third edge node 203, a fourth edge node 204, and a fifth edge node 205. Each of these edge nodes may be positioned in a different geographic position as shown on a map 270. The map 270 includes a first region 271, a second region 272, and the third region 273. The first region 271 may include the first edge node 201 and the second edge node 202. The second region 272 may include the third edge node 203. The third region 273 may include the fourth edge node 204 and the fifth edge node 205. A region may be defined based on a set distance from a center point, a geographical definition (e.g., a zip code area, a county, a state, a national region, a national area, etc.), or another custom-defined set of areas.

Each of the nodes shown in the map 270 may be connected to a network 215. The nodes may represent one or more various types of electronic devices, such as mobile computing devices, terminals, payment devices, etc. Over the course of the life of these devices, one or more of them may be compromised, such as by the installation of keyloggers, RFID stealing devices, card swipe devices, etc. In many cases, malicious organizations may intentionally install software or hardware to retrieve personal information and transaction information for later use, and may intentionally stagger the use of this data long after any installed software or devices are removed. Detecting and mitigating the damage created by such actions may require a greater degree of sophistication.

Some embodiments may address these issues by first obtaining data from either an in-network data source 220 or an out-of-network data source 260, where the data may indicate one or more anomalies for an event type associated with event participant identifiers. In some embodiments, an event participant may be a participant engaged in effectuating a transaction, receiving data from one or more other computer devices via the network 215, or performing other activities that causes the transmission of messages via the network 215. For example, some embodiments may receive an indication that the accounts associated with the identifiers "acc1," "acc2," "acc3," or "acc4" are compromised. In response, some embodiments may determine that any database transaction involving these accounts or attempt to access data involving these accounts are events of a flagged event type.

Some embodiments may then determine event rates and event rate gradients for the nodes in the map 270. After analyzing the event rate gradients, some embodiments may determine that an event rate gradient for the first edge node 201 and the third edge node 203 both have event sequences indicating the earliest event rate gradient that exceeds an acceleration threshold and, in response, perform a second search for events in the same region as the first edge node 201. Some embodiments may then filter a set of candidate compromised nodes based on a shared geographic identifier to determine if these candidate compromised nodes are within a geographic location. For example, some embodiments may determine the second edge node 202 is in the same geographic region as the first edge node 201 (i.e., the first region 271). Some embodiments may then determine whether any of these other devices show an increased event rate (e.g., a rate that satisfies a minimum event rate threshold). For example, some embodiments may then determine that the second edge node 202 shows an event rate for events of a flagged event type equal to 73 events of the flagged event type during a first time block, where the event rate threshold is first exceeded at this first time block amongst the set of candidate compromised nodes that includes the first edge node 201, the second edge node 202, and the third edge node 203. Some embodiments may then expand or otherwise update a time window such that a search includes this first time block and then perform a search for all nodes that satisfies an event rate threshold for this updated time window.

Some embodiments may then select the first edge node 201, the second edge node 202, and the third edge node 203 as a set of compromise nodes. In response to assigning the status of "compromised node" to these nodes, some embodiments may perform remedial actions or increased monitoring activity. For example, some embodiments may restrict network access to the first edge node 201, second edge node 202, or the third edge node 203, where such restrictions may be specific to certain identifiers, certain types of interactions or transactions, or be broadened to any type of network communication from these nodes. Alternatively, or additionally, some embodiments may apply one or more monitoring filters to traffic from these notes. For example, some embodiments may implement a rules-based system for transactions from these devices to prevent these devices from effectuating transactions that exceed a particular threshold. Furthermore, some embodiments may send instructions to client devices that indicate the locations of a compromised node, where a user may review such messages and travel to the compromised node to resolve one or more compromise devices.

Figure 3:
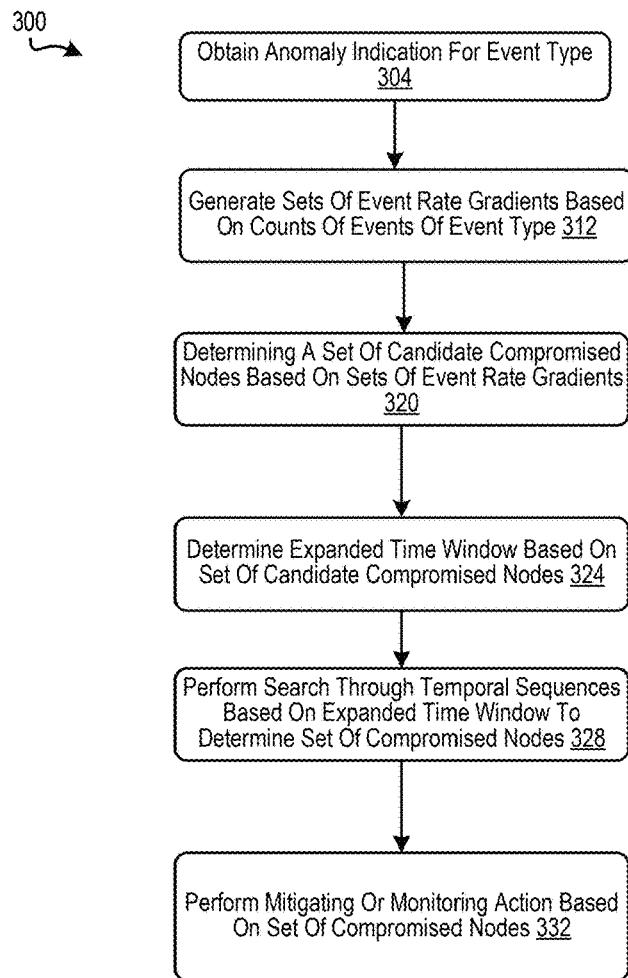
FIG. 3 illustrates an example flowchart of a process for isolating or otherwise processing an enhanced compromised edge node in a computing device network based on tracking event patterns in off-network data, in accordance with an implementation.

FIG. 3 illustrates an example flowchart of a process for isolating or otherwise processing an enhanced compromised edge node in a computing device network based on tracking event patterns in off-network data, in accordance with an implementation. Some embodiments may obtain an anomaly indication for an event type, as indicated by block 304. In some embodiments, an external threat intelligence may transmit an alert indicating flagged accounts, flagged users, or other types of flagged identifiers indicating anomalous activity. For example, some embodiments may receive a notification for a set of identifiers from a source monitoring dark web activity. Some embodiments may ingest this external notification and perform further operations described in this disclosure to discover one or more compromised devices. Alternatively, or additionally, some embodiments may retrieve regular updates from one or more in-network device indicating that an account is showing signs of anomalous activity (e.g., by discovering that a database transaction or series of database transactions violates an internal rule).

Some embodiments may generate one or more sets of event rate gradients based on counts of events of the event type, as indicated by block 312. Some embodiments may generate sets of event rate gradients that are associated with sets of time blocks, where a time block may be a pre-defined or user-defined period. For example, a time-block may include a day, a week, 10-day period, a month, a year, or some other interval of time. Some embodiments may determine event rate gradients by first counting, for each respective temporal sequence of the temporal sequences representing event histories for a node, the number of events in that respective temporal sequence within each time block. Some embodiments may then determine event rates by computing the per-time-period differentials of the events and compute rate gradients based on a per-time-period differential of the event rates. Furthermore, some embodiments may restrict such event counts to events of a specified set of event types. For example, some embodiments may restrict event counts to events involving transactions involving one of a flagged set of accounts, events involving database operations affecting one of a flagged set of records, etc.

When dealing with a large number of devices, some embodiments may implement sampling methods. Some embodiments may randomly select a set of edge nodes for the purposes of detecting edge gradients for perform other operations described in this disclosure. In some embodiments, some embodiments may sample the set of candidate compromised nodes using a set random values to obtain a set of sampled nodes; and generating the sets of event rate gradients based on sequences associated with the set of sampled nodes. For example, some embodiments may select a statistically significant random sample of 10,000 devices from a total pool of 1,000,000 network edge nodes. Some embodiments may then apply operations described in this disclosure (e.g., determining event rates, determining event rate gradients, comparing these values or other values derived from a device event history to a corresponding threshold) to each sampled device instead of applying these operations to every edge node in a network.

Some embodiments may select nodes for monitoring based on known geographic similarities (e.g., using operations described in this disclosure to detect fraud ring at certain geolocations or zip code). Some embodiments may implement a score-based system to detect which nodes to investigate and automatically increase the scores for nodes at the geolocations or shared zip code. When implementing or executing a score-based system, some embodiments may score a set of candidate compromised nodes based on the event rates to determine a first score associated with a first edge node, such as by assigning greater scores nodes having greater event rates. Some embodiments may then select the maximum event rate corresponding with each node as the characterizing event rate for that node. Furthermore, some embodiments may update the set candidate compromised nodes by adding a second edge node to the set of compromised nodes based on a shared association between a geographic location category and the first edge node.

Some embodiments may determine a set of candidate compromised nodes based on the sets of event rate gradients, as indicated by block 320. Some embodiments may select a set of time blocks for which an associated set of event rate gradients falls below an acceleration threshold to identify a set of candidate compromised nodes. For example, some embodiments may search through a cluster of edge devices and identify Device-12 as the first to reach an acceleration threshold greater than three events of a flagged event type per month per month (events/month^2). In response, some embodiments may select Device-12 as candidate compromised node.

An acceleration threshold may be used to detect a potential point of compromise. In some embodiments, the acceleration threshold may be set to zero, in which any increase the number of transactions involving a compromised account will lead to a determination that the node being used to effectuate the account is compromised. Alternatively, the acceleration threshold may be equal to a non-zero value to account for noise, inevitable increases in the number of compromised accounts as time goes forward, etc. For example, some embodiments may set an acceleration threshold equal to a pre-defined value (e.g., a value less than 10 events/month^2). Alternatively, some embodiments may study a historic pattern of event gradients and set an acceleration threshold to be equal to or otherwise determined from a historic maximum event gradient.

Alternatively, or additionally, some embodiments may select a node for inclusion a set of candidate compromised nodes based on the event rate gradient for that node being the greatest. For example, some embodiments may identify an edge node as being associated with a greatest event rate gradient by having an event rate gradient of 87, where event rate gradients may range from 0 events per month per month (events/month^2) to 87 events/month^2. By selecting edge nodes based on being associated with a greatest event rate gradient, some embodiments may account for alternative patterns that may indicate a compromised node. Furthermore, instead of using event rate gradients, some embodiments may apply similar operations to select nodes as candidate compromised nodes based on event rates directly (e.g., selecting a node based on having a history of events that are part of a top-K event rate).

Some embodiments may determine an expanded time window based on a set of candidate compromised nodes, as indicated by block 324. Some embodiments may determine an expanded time window based on an earliest time block that satisfies an event rate threshold or a geographic-based criteria. For example, some embodiments may select a time block corresponding with January 2XXX as the first month, where the event rate for an event type covering login messages involving a specified set of compromised accounts exceeds a default threshold. In the case where January 2XXX would exceed a six-month time window (e.g., because a current period is December 2XXX). Some embodiments may adjust the baseline time window from six months to accommodate this period (e.g., set the baseline time window to twelve months for this event rate type). Alternatively, or additionally, some embodiments may further implement a set of geographic filters to filter out unrelated nodes that are not within a geographic range of an initial set of candidate nodes. Such geographic filters may prevent noisy data or unrelated causes for a device's elevated event rate from affecting services related to detecting compromised devices.

Some embodiments may determine thresholds for metrics based on sub-categories of events, locations involved in an event, or devices involved in those events. For example, some embodiments may determine a threshold corresponding with a first event type based on a count of events of that first event type in a first time period and a second threshold with a second event type based on a count of events of that second event type. Some embodiments may dynamically implement such operations for event rates, such as by obtaining a transaction rate associated with a device category associated with the set of candidate compromised nodes and determine the event rate threshold based on the transaction rate. For example, some embodiments may count the number of transactions that indicates the involvement of at least one record of a flagged set of database account records for those transactions. Some embodiments may then set dynamic thresholds by device type involving those records to a baseline value for each respective edge node, such as by setting the threshold to be an average (e.g., mean average, median average, etc.) value. After setting the thresholds for an event rate, some embodiments may use this event rate threshold as a test to determine whether a device should be included in a set of compromised devices.

Some embodiments may permit user-provided data or other external data to update a set of candidate nodes or a set of geographic regions to investigate. Additionally, some embodiments may permit a user or a data source to adjust the size of a subset that is adjustable. For example, some embodiments may obtain data from an out-of-network data source identifying a preliminary set of compromised nodes or data useful for identifying the preliminary set of compromised nodes. For example, some embodiments may obtain data from a dark web-connected source that is isolated from a main network or another out-of-network data source, where the data indicates one or more compromised nodes. In response, some embodiments may directly add the indicated compromised node to a list of compromised nodes and use these nodes as a preliminary set of edge nodes usable for searching for further candidate compromised nodes (e.g., via a search).

Some embodiments may perform a search through a set of temporal sequences based on the expanded time window to determine a set of compromised nodes, as indicated by block 328. Some embodiments may query a logging platform to search for events of a flagged event type across the web server cluster between an expanded time window. For example, some embodiments may use operations described in this disclosure to detect a time window equal to ten months. In response, some embodiments may then use an analytics engine to filter a sequence of event logs representing temporal sequences of events to specifically match events of a flagged event type for the ten months window.

Some embodiments may use one or more types of machine learning models to detect compromised nodes, either as a set of candidate compromised nodes used to determine an output set of compromised nodes that will be monitored or restricted or as part of the output set of compromised nodes. For example, some embodiments may provide one or more sets of event-based data (e.g., event rate, event rate gradients, participant identifiers, transaction amounts indicated by event data, characteristics of the events, etc.) to a machine learning model. For example, some embodiments may provide, as a set of inputs to a gradient boosting machine, features such as event history, a set of labels of a node, device use frequency of the node, or other data of the node. A set of labels for node may include information related to a device type, a device use, a likely frequency of use, a location, etc. In some embodiments, the gradient boosting machine may then respond to these inputs with an output indication to indicate whether the node is compromised. Furthermore, it should be understood that various other types of machine learning models may be used to respond to output a prediction on whether a node is a compromised mode, such as a neural network model (e.g., a transformer-based model) or naïve bayes model. Some embodiments may implement gradient boosting machine models to classify nodes during operations involving the processing of large amounts of database transactions or other network activity due to the low computation costs of such models.

Some embodiments may integrate machine learning classifications systems (e.g., a system that ingests features to output a classification of a device as being compromised or not) together using a rule-based system. Alternatively, or additionally, some embodiments may use machine learning models to generate a likelihood score for a point of compromise for each monitored device of a set of monitored devices. In some embodiments, the greater the score, the more likely the device might be a compromised device. Furthermore, some embodiments may use a generative language model to combine a rule-based and machine learning approach to the detection of point of compromise incidents. For example, some embodiments may use a generative language model to generate a custom rule that combines both scores from an original rules-based system and a machine learning model system to an augmented score for a device, where the augmented score may then be used to determine whether the device is compromised.

Some embodiments may identify an organization assigned with one or more network edge nodes as potential points of compromise and use this identification to expand or otherwise modify a search for points of compromise. Some embodiments may use this information by first detecting an initial set of compromised nodes using operations in this disclosure or obtaining compromised node identities from another data source. Some embodiments may then search additional edge nodes for incidents associated with a geographic region associated with the set of compromised nodes to detect a malicious identifier. After determining a malicious identifier, some embodiments may then assign the malicious identifier to the set of compromised nodes in response to detecting the malicious identifier in at least one node of the additional edge nodes. For example, some embodiments may examine whether the zip code(s) or another defined geographic region of a newly discovered set of compromised nodes overlaps with the defined geographic regions of any existing compromised nodes. If the geographic regions do overlap, some embodiments may assign a malicious identifier assigned to one set of compromised nodes to the other set of compromised nodes. For example, some embodiments may assign the newly discovered set of compromised nodes with the same malicious identifier that was already assigned to the malicious identifier.

Some embodiments may determine a set of flags for nodes (e.g., via an out-of-network data source or an in-network data source) that a first subset of the set of flags is correlated or cross-correlated with one or more other subsets of the set of flags based on a correlation threshold. A correlation may include a correlation value between −1.0 to +1.0, such as 0.5, 0.6, or some other correlation value. Some embodiments may then remove this first subset of the set of flags from a filtered set of flags to be input into a prediction model. Some embodiments may then determine some or all of the nodes of a set of compromised nodes by providing the filtered set of flags to a prediction model (e.g., gradient boosting machine model, a neural network model, etc.), where the output of the nodes may be or include the set of compromised nodes.

Some embodiments may set up multiple thresholds to determine a point of compromise. For example, some embodiments may set a first ratio threshold for a first flag (e.g., "int_flag") to be equal to 10%, set a second threshold for a second flag (e.g., "ext_flag") to be equal to 12%, set a third ratio threshold for a third flag (e.g., "overlapped flags") to be equal to 8%, and set a fourth ratio threshold for a fourth flag (e.g. "combined flags") to be equal to 16%. Some embodiments may use different values for thresholds to accommodate the possibility that different flags may be more or less correlated with each other or with being assigned to a point of compromise. In some embodiments, a threshold for an overlapped flag may be least with respect to an "int_flag" or an "ext_flag" due to such a flag being a strongest indicator of a compromised node.

Some embodiments may perform mitigating or monitoring action based on the set of compromised nodes, as indicated by block 332. When performing monitoring actions, some embodiments may apply a monitoring filter to traffic for the set of compromised nodes (e.g., a rule-based security filter). The monitoring filter may be set to detect anomalous behavior like unusual port access, suspicious packet signatures, the involvement of flagged accounts, etc. In some embodiments, the filter may automatically trigger alerts after detecting potentially malicious activity. When performing mitigating activities such as restriction, some embodiments may isolate compromised nodes by implementing a quarantine policy through a network firewall. The isolation may block network traffic that does not satisfy monitoring channels or other criteria.

Some embodiments that activate a monitoring or restriction process for a node may later deactivate the monitoring or restriction process. In the case of a monitoring process, some embodiments may have initially activated a monitoring filter and then deactivated the monitoring filter for that monitoring filter based on an elapsed time. For example, some embodiments may assign a first node with the label "compromised node" using one or more operations described in this disclosure. In some embodiments, the node may be physically or virtually investigated or transactions involving this node may be tracked for further anomalies. Some embodiments may then determine a result indicating that, within a duration threshold (e.g., a time less than one month, a time less than six months, a time less than or equal to a year, a time less than or equal to ten years), no event of a flagged event type has occurred. In response to this result, some embodiments may deactivate a monitoring service process applied to the node or remove one or more restrictions on the node.

Computing Environment

Figure 4:
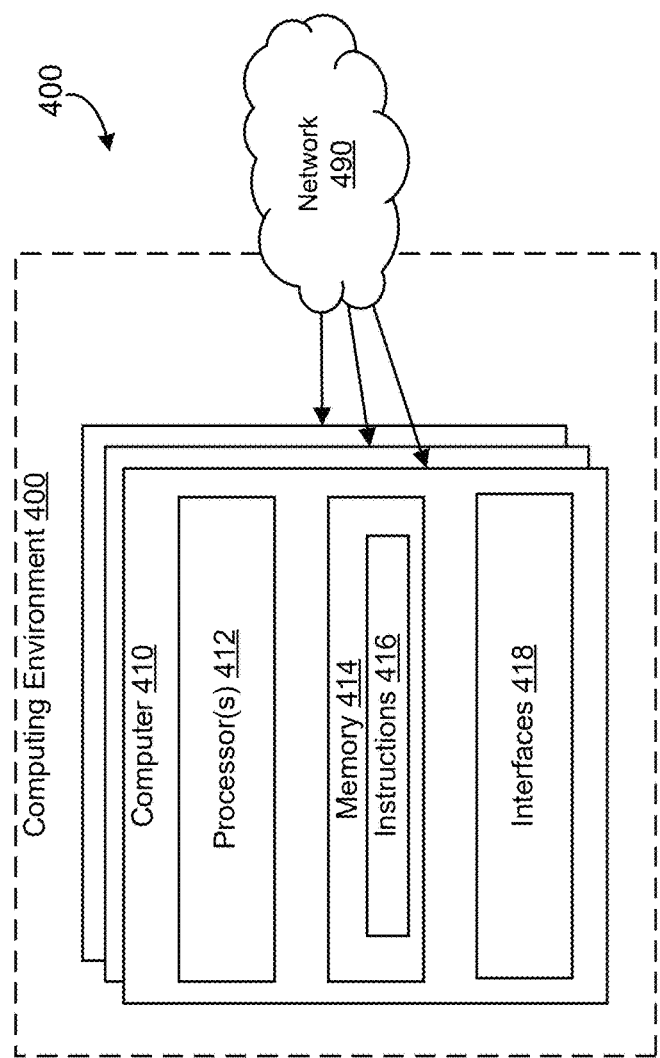
FIG. 4 discloses a computing environment in which aspects of the present disclosure may be implemented.

FIG. 4 discloses a computing environment 400 in which aspects of the present disclosure may be implemented. A computing environment 400 includes a set of computers 410, where the set of computers 410 may include of one or more virtual or physical computers that individually or in cooperation achieve tasks, such as implementing one or more aspects described herein. The set of computers 410 have components that cooperate to cause output based on input. The set of computers 410 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 400 includes at least one physical computer.

The computing environment 400 may specifically be used to implement one or more aspects described herein. In some examples, one or more of the set of computers 410 may be implemented as a user device, such as a mobile device, and others of the set of computers 410 may be used to implement aspects of a machine learning framework usable to train and deploy models exposed to the mobile device or provide other functionality, such as through exposed application programming interfaces.

The computing environment 400 can be arranged in any of a variety of ways. In some embodiments, one or more computers of the set of computers 410 can be local to or remote from other computers of the set of computers 410 of the computing environment 400. In some embodiments, the set of computers 410 may be arranged according to client-server models, peer-to-peer models, edge computing models, other models, or combinations thereof.

In many examples, the set of computers 410 are communicatively coupled with devices internal or external to the computing environment 400 via a network 490. The network 490 is a set of devices that facilitate communication from a sender to a destination, such as by implementing communication protocols. Example network 490 include local area networks, wide area networks, intranets, or the Internet.

In some implementations, the set of computers 410 can be general-purpose computing devices (e.g., consumer computing devices). In some instances, via hardware or software configuration, the set of computers 410 can be special purpose computing devices, such as servers able to practically handle large amounts of client traffic, machine learning devices able to practically train machine learning models, data stores able to practically store and respond to requests for large amounts of data, other special purpose computers, or combinations thereof. The relative differences in capabilities of different kinds of computing devices can result in certain devices specializing in certain tasks. For instance, a machine learning model may be trained on a powerful computing device and then stored on a relatively lower powered device for use.

In some embodiments, one or more computers of the set of computers 410 include one or more processors 412, memory 414, and one or more interfaces 418. Such components can be virtual, physical, or combinations thereof.

The one or more processors 412 are components that execute instructions, such as instructions that obtain data, process the data, and provide output based on the processing. The one or more processors 412 often obtain instructions and data stored in the memory 414. The one or more processors 412 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 412 include at least one physical processor implemented as an electrical circuit. Examples of one or more processors 412 may include INTEL, AMD, QUALCOMM, TEXAS INSTRUMENTS, and APPLE processors.

The memory 414 is a collection of components configured to store instructions 416 and data for later retrieval and use. The instructions 416 can, when executed by the one or more processors 412, cause the execution of one or more operations that implement aspects described herein. In many examples, the memory 414 may be one or more non-transitory, machine-readable media, such as random-access memory, read-only memory, cache memory, registers, portable memory (e.g., enclosed drives or optical disks), mass storage devices, hard drives, solid state drives, other kinds of memory, or combinations thereof. In certain circumstances, memory may be transitory and may store information encoded in transient signals.

The one or more interfaces 418 are components that facilitate receiving input from and providing output to something external to the set of computers 410, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 418 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 418 can facilitate connection of the computing environment 400 to a network 490.

The set of computers 410 can include any of a variety of other components to facilitate the performance of operations described herein. Example components include one or more power units (e.g., batteries, capacitors, power harvesters, or power supplies) that provide operational power, one or more buses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions), among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 5:
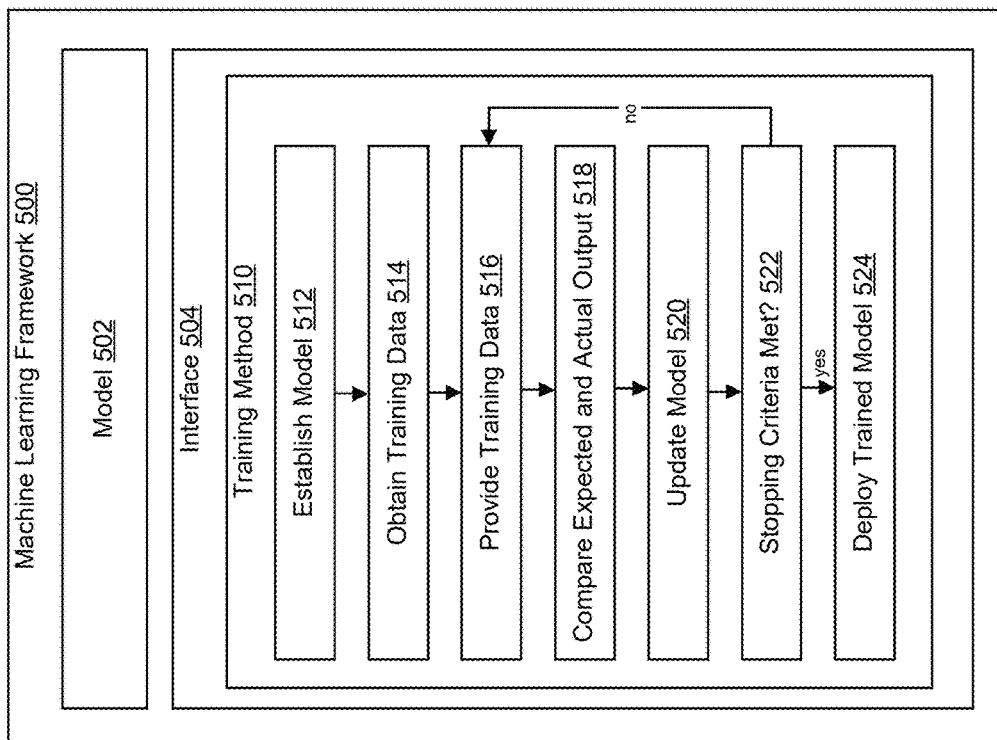

FIG. 5 illustrates an example machine learning framework 500 that techniques described herein may benefit from. A machine learning framework 500 is a collection of software and data that implements artificial intelligence trained to provide output, such as predictive data, based on input. Examples of artificial intelligence that can be implemented with machine learning ways include neural networks (e.g., graph neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. A machine learning framework 500 or components thereof are often built or refined from existing frameworks, such as TENSORFLOW by GOOGLE, INC. or PYTORCH by the PYTORCH community.

The machine learning framework 500 can include one or more versions of the model 502 that are the structured representation of learning and an interface 504 that supports use of the model 502. The model 502 can take any of a variety of forms. In many examples, the model 502 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 502 can include a representation of memory (e.g., providing long short-term memory functionality). Where the set includes multiple versions of the model 502, the multiple versions of the model 502 can be linked, cooperate, or compete to provide output.

The interface 504 can include software procedures (e.g., defined in a library) that facilitate the use of the model 502, such as by providing a way to establish and interact with the model 502. For instance, the software procedures can include software for receiving input, preparing input for use (e.g., by performing vector embedding, such as using Word2Vec, BERT, or another technique), processing the input with the model 502, providing output, training the model 502, performing inference with the model 502, fine-tuning the model 502, other procedures, or combinations thereof.

In an example implementation, interface 504 can be used to facilitate a training method 510 that can include operation 512. Operation 512 includes establishing a model 502, such as initializing a model 502. The establishing can include setting up the model 502 for further use (e.g., by training or fine tuning). The model 502 can be initialized with values. In examples, the model 502 can be pretrained. Operation 514 can follow operation 512. Operation 514 includes obtaining training data. In many examples, the training data includes pairs of input and desired output given the input. In supervised or semi-supervised training, the data can be prelabeled, such as by human or automated labelers. In unsupervised learning, the training data can be unlabeled. The training data can include validation data used to validate the model 502 after the model 502 is trained. Operation 516 can follow operation 514. Operation 516 includes providing a portion of the training data to the model 502. This can include providing the training data in a format usable by the model 502. The machine learning framework 500 (e.g., via the interface 504) can cause the model 502 to produce an output based on the input. Operation 518 can follow operation 516. Operation 518 includes comparing the expected output with the actual output. In an example, this can include applying a loss function to determine the difference between expected and actual. This value can be used to determine how training is progressing. Operation 520 can follow operation 518. Operation 520 includes updating the model 502 based on the result of the comparison. This can take any of a variety of forms depending on the nature of the model 502. Where the model 502 includes weights, the weights can be modified to increase the likelihood that the model 502 will produce the correct output given an input. Depending on the model 502, backpropagation or other techniques can be used to update the model 502. Operation 522 can follow operation 520. Operation 522 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 514. If the stopping criterion has been satisfied, the flow can move to operation 524. Operation 524 includes deploying the model 502 for use in production, such as providing the model 502 with real-world input data and producing output data used in a real-world process. The model 502 can be stored in memory 414 of the set of computers 410 or distributed across memories of two or more computers of the set of computers 410 for production of output data (e.g., predictive data).

Application of Techniques

Techniques herein may be applicable to improving technological processes of a financial institution, such as technological aspects of actions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more. As used in this disclosure, a random process may include a pseudorandom process that involves the use of one or more algorithms to generate pseudorandom values. A random process may also include a physics-based random process that involves the use of a physical measurement to generate a random value.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage the training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

In some embodiments, the various computer systems and subsystems illustrated in the figures may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more of the devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the words "can" or "may" are used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computer device," "computing device," or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of a remote computing device, the set of servers 140, or another set of electronic devices described in this disclosure) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

EMBODIMENTS

The present techniques will be better understood with reference to the following enumerated embodiments.

Embodiment A.1. A method comprising: obtaining, from an out-of-network data source, an anomaly indication for an event type associated with a set of event participant identifiers indicated by temporal sequences for a network; determining a set of compromised nodes based on the events of the event type; and applying a monitoring filter to traffic for the set of compromised nodes.

Embodiment A.2. A method comprising: obtaining, from an out-of-network data source, an anomaly indication for an event type associated with a set of event participant identifiers indicated by temporal sequences for a network; generating sets of event rate gradients associated with sets of time blocks based on event rates for events of the event type indicated by the temporal sequences; determining a set of compromised nodes by: selecting a set of time blocks for which an associated set of event rate gradients falls below an acceleration threshold to identify a set of candidate compromised nodes; and determining an expanded time window based on an earliest time block of the set of candidate compromised nodes satisfying an event rate threshold and a geographic-based criteria; and performing a search through the temporal sequences based on the expanded time window and the event type to obtain the set of compromised nodes; and applying a monitoring filter to traffic for the set of compromised nodes.

Embodiment A.3. A method comprising: obtaining, from an out-of-network data source, an anomaly indication for an event type associated with a set of event participant identifiers indicated by temporal sequences for a network; generating sets of event rate gradients associated with sets of time blocks based on event rates for events of the event type indicated by the temporal sequences; determining a set of compromised nodes by: selecting a set of time blocks for which an associated set of event rate gradients falls below an acceleration threshold to identify a set of candidate compromised nodes; and determining an expanded time window based on an earliest time block of the set of candidate compromised nodes satisfying an event rate threshold and a geographic-based criteria; and performing a search through the temporal sequences based on the expanded time window and the event type to obtain the set of compromised nodes; and applying a monitoring filter to traffic for the set of compromised nodes.

Embodiment A.4. A method comprising: obtaining, from an out-of-network data source, a malicious anomaly indication for an event type associated with a set of event participant identifiers indicated by temporal sequences for a network, wherein each respective temporal sequence indicates a respective subset of events for a respective edge node of the network; generating sets of event rate gradients by determining, for each respective time block of a respective set of time blocks in a respective sequence of the temporal sequences, a respective event rate gradient corresponding with the event type for the respective temporal sequence; determining a set of compromised nodes by: selecting a set of time blocks for which an associated set of event rate gradients falls below an acceleration threshold to identify a set of candidate compromised nodes, filtering the set of candidate compromised nodes by a shared geographic identifier to detect a preliminary set of compromised nodes; determining an expanded time window based on an earliest time block of the preliminary set of compromised nodes satisfying an event rate threshold; and performing a search through the temporal sequences based on the expanded time window and the event type to obtain the set of compromised nodes; and restricting network access for the set of compromised nodes.

Embodiment A.5. A method comprising: obtaining, from an out-of-network data source, an anomaly indication for an event type associated with a set of event participant identifiers indicated by temporal sequences for a network; generating sets of event rate gradients associated with sets of time blocks based on event rates for events of the event type indicated by the temporal sequences; determining a set of compromised nodes by: selecting a set of time blocks for which an associated set of event rate gradients falls below an acceleration threshold to identify a set of candidate compromised nodes; and determining an expanded time window based on an earliest time block of the set of candidate compromised nodes satisfying an event rate threshold and a geographic-based criteria; and performing a search through the temporal sequences based on the expanded time window and the event type to obtain the set of compromised nodes; and applying a monitoring filter to traffic for the set of compromised nodes.

Embodiment A.6. The method of any of the embodiments above, wherein generating the sets of event rate gradients comprises: sampling the set of candidate compromised nodes using a set random values to obtain a set of sampled nodes; and generating the sets of event rate gradients based on sequences associated with the set of sampled nodes.

Embodiment A.7. The method of any of the embodiments above, further comprising: obtaining a transaction rate associated with a device category associated with the set of candidate compromised nodes; and determining the event rate threshold based on the transaction rate.

Embodiment A.8. The method of any of the embodiments above, further comprising: scoring the set of candidate compromised nodes based on the event rates to determine a first score associated with a first edge node; and adding a second edge node to the set of compromised nodes based on a shared association between a geographic location category and the first edge node.

Embodiment A.9. The method of any of the embodiments above, wherein obtaining the anomaly indication comprises receiving data from a computer system in communication with both the network and at least one computer that is out-of-network.

Embodiment A.10. The method of any of the embodiments above, further comprising: obtaining data from the out-of-network data source identifying a preliminary set of edge nodes; and updating the set of compromised nodes to comprise the preliminary set of edge nodes.

Embodiment A.11. The method of any of the embodiments above, further comprising obtaining a set of labels for nodes of the network, wherein determining the set of compromised nodes comprises determining the set of compromised nodes by providing, as a set of inputs, the sets of event rate gradients and the set of labels to a machine learning model, wherein the machine learning model comprises a gradient boosting machine or a neural network.

Embodiment A.12. The method of any of the embodiments above, further comprising: searching additional edge nodes for incidents associated with a geographic region associated with the set of compromised nodes to detect a malicious identifier; and assigning the malicious identifier to the set of compromised nodes in response to detecting the malicious identifier in at least one node of the additional edge nodes.

Embodiment A.13. The method of any of the embodiments above, wherein the acceleration threshold is greater than zero.

Embodiment A.14. The method of any of the embodiments above, wherein the expanded time window is greater than or equal to six months.

Embodiment A.15. The method of any of the embodiments above, further comprising deactivating the monitoring filter based on an elapsed time without detecting another event of the event type after applying the monitoring filter within a duration threshold.

Embodiment A.16. The method of any of the embodiments above, further comprising: receiving a set of flags; determining that a first subset of the set of flags is correlated or cross-correlated with one or more other subsets of the set of flags based on a correlation threshold, wherein determining the set of compromised nodes comprises providing, to a prediction model, a filtered set of flags to determine the set of compromised nodes, wherein the filtered set of flags does not comprise the first subset of the set of flags.

Embodiment A.17. The method of any of the embodiments above, wherein generating the sets of event rate gradients comprises: sampling the set of candidate compromised nodes using a set random values to obtain a set of sampled nodes; and generating the sets of event rate gradients based on sequences associated with the set of sampled nodes.

Embodiment A.18. The method of any of the embodiments above, further comprising: obtaining a transaction rate associated with a device category associated with the set of candidate compromised nodes; and determining the event rate threshold based on the transaction rate.

Embodiment A.19. The method of any of the embodiments above, further comprising: scoring the set of candidate compromised nodes based on the event rates to determine a first score associated with a first edge node; and adding a second edge node to the set of compromised nodes based on a shared association between a geographic location category and the first edge node.

Embodiment A.20. The method of any of the embodiments above, further comprising: obtaining data from the out-of-network data source identifying a preliminary set of edge nodes; and updating the set of compromised nodes to comprise the preliminary set of edge nodes.

Embodiment A.21. The method of any of the embodiments above, further comprising obtaining a set of labels for nodes of the network, wherein determining the set of compromised nodes comprises determining the set of compromised nodes by providing, as a set of inputs, the sets of event rate gradients and the set of labels to a machine learning model, wherein the machine learning model comprises a gradient boosting machine or a neural network.

Embodiment A.22. The method of any of the embodiments above, further comprising: searching additional edge nodes for incidents associated with a geographic region associated with the set of compromised nodes to detect a malicious identifier; and assigning the malicious identifier to the set of compromised nodes in response to detecting the malicious identifier in at least one node of the additional edge nodes.

Embodiment A.23. One or more tangible, non-transitory, machine-readable media storing instructions that, when executed by a set of processors, cause the set of processors to effectuate operations including those of any of embodiments A.1 to A.20.

Embodiment A.24. A system comprising: a set of processors and a set of media storing computer program instructions that, when executed by the set of processors, cause the set of processors to effectuate operations including those of any of embodiments A.1 to A.20.

What is claimed is:

1. A system for isolating compromised edge nodes in a computing device network based on tracking event patterns in off-network data, the system comprising one or more processors and one or more non-transitory machine-readable media storing program instructions that, when executed by the one or more processors, causes the one or more processors to perform operations comprising:
    obtaining, from an out-of-network data source, a malicious anomaly indication for an event type associated with a set of event participant identifiers indicated by temporal sequences for a network, wherein each respective temporal sequence indicates a respective subset of events for a respective edge node of the network;
    generating sets of event rate gradients by determining, for each respective time block of a respective set of time blocks in a respective sequence of the temporal sequences, a respective event rate gradient corresponding with the event type for the respective temporal sequence;
    determining a set of compromised nodes by:
        selecting a set of time blocks for which an associated set of event rate gradients falls below an acceleration threshold to identify a set of candidate compromised nodes,
        filtering the set of candidate compromised nodes by a shared geographic identifier to detect a preliminary set of compromised nodes;
        determining an expanded time window based on an earliest time block of the preliminary set of compromised nodes satisfying an event rate threshold;
        performing a search through the temporal sequences based on the expanded time window and the event type to obtain the set of compromised nodes; and
    restricting network access for the set of compromised nodes;
    searching additional edge nodes for incidents associated with a geographic region associated with the set of compromised nodes to detect a malicious identifier; and
    assigning the malicious identifier to the set of compromised nodes in response to detecting the malicious identifier in at least one node of the additional edge nodes.

2. A method comprising:
    obtaining, from an out-of-network data source, an anomaly indication for an event type associated with a set of event participant identifiers indicated by temporal sequences for a network;
    generating sets of event rate gradients associated with sets of time blocks based on event rates for events of the event type indicated by the temporal sequences;
    determining a set of compromised nodes by:
        selecting a set of time blocks for which an associated set of event rate gradients falls below an acceleration threshold to identify a set of candidate compromised nodes;

filtering the set of candidate compromised nodes by a shared geographic identifier to detect a preliminary set of compromised nodes; and determining an expanded time window based on an earliest time block of the set of candidate compromised nodes satisfying an event rate threshold and a geographic-based criteria;

performing a search through the temporal sequences based on the expanded time window and the event type to obtain the set of compromised nodes;

applying a monitoring filter to traffic for the set of compromised nodes;

searching additional edge nodes for incidents associated with a geographic region associated with the set of compromised nodes to detect a malicious identifier; and assigning the malicious identifier to the set of compromised nodes in response to detecting the malicious identifier in at least one node of the additional edge nodes.

3. The method of claim 2, wherein generating the sets of event rate gradients comprises:

sampling the set of candidate compromised nodes using a set random values to obtain a set of sampled nodes; and generating the sets of event rate gradients based on sequences associated with the set of sampled nodes.

4. The method of claim 2, further comprising:

obtaining a transaction rate associated with a device category associated with the set of candidate compromised nodes; and determining the event rate threshold based on the transaction rate.

5. The method of claim 2, further comprising:

scoring the set of candidate compromised nodes based on the event rates to determine a first score associated with a first edge node; and adding a second edge node to the set of compromised nodes based on a shared association between a geographic location category and the first edge node.

6. The method of claim 2, wherein obtaining the anomaly indication comprises receiving data from a computer system in communication with both the network and at least one computer that is out-of-network.

7. The method of claim 2, further comprising:

obtaining data from the out-of-network data source identifying a preliminary set of edge nodes; and updating the set of compromised nodes to comprise the preliminary set of edge nodes.

8. The method of claim 2, further comprising obtaining a set of labels for nodes of the network, wherein determining the set of compromised nodes comprises determining the set of compromised nodes by providing, as a set of inputs, the sets of event rate gradients and the set of labels to a machine learning model, wherein the machine learning model comprises a gradient boosting machine or a neural network.

9. The method of claim 2, wherein the acceleration threshold is greater than zero.

10. The method of claim 2, wherein the expanded time window is greater than or equal to six months.

11. One or more non-transitory, machine-readable media storing program instructions that, when executed by one or more processors, causes the one or more processors to perform operations comprising:

obtaining, from an out-of-network data source, an anomaly indication for an event type associated with a set of event participant identifiers indicated by temporal sequences for a network;

generating sets of event rate gradients associated with sets of time blocks based on event rates for events of the event type indicated by the temporal sequences;

determining a set of compromised nodes by:

selecting a set of time blocks for which an associated set of event rate gradients falls below an acceleration threshold to identify a set of candidate compromised nodes;

filtering the set of candidate compromised nodes by a shared geographic identifier to detect a preliminary set of compromised nodes; and determining an expanded time window based on an earliest time block of the set of candidate compromised nodes satisfying an event rate threshold and a geographic-based criteria;

performing a search through the temporal sequences based on the expanded time window and the event type to obtain the set of compromised nodes;

applying a monitoring filter to traffic for the set of compromised nodes;

searching additional edge nodes for incidents associated with a geographic region associated with the set of compromised nodes to detect a malicious identifier; and assigning the malicious identifier to the set of compromised nodes in response to detecting the malicious identifier in at least one node of the additional edge nodes.

12. The one or more machine-readable media of claim 11, the operations further comprising deactivating the monitoring filter based on an elapsed time without detecting another event of the event type after applying the monitoring filter within a duration threshold.

13. The one or more machine-readable media of claim 11, the operations further comprising:

receiving a set of flags;

determining that a first subset of the set of flags is correlated or cross-correlated with one or more other subsets of the set of flags based on a correlation threshold, wherein determining the set of compromised nodes comprises providing, to a prediction model, a filtered set of flags to determine the set of compromised nodes, wherein the filtered set of flags does not comprise the first subset of the set of flags.

14. The one or more machine-readable media of claim 11, wherein generating the sets of event rate gradients comprises:

sampling the set of candidate compromised nodes using a set random values to obtain a set of sampled nodes; and generating the sets of event rate gradients based on sequences associated with the set of sampled nodes.

15. The one or more machine-readable media of claim 11, the operations further comprising:

obtaining a transaction rate associated with a device category associated with the set of candidate compromised nodes; and determining the event rate threshold based on the transaction rate.

16. The one or more machine-readable media of claim 11, the operations further comprising:

scoring the set of candidate compromised nodes based on the event rates to determine a first score associated with a first edge node; and adding a second edge node to the set of compromised nodes based on a shared association between a geographic location category and the first edge node.

17. The one or more machine-readable media of claim 11, further comprising:

obtaining data from the out-of-network data source identifying a preliminary set of edge nodes; and updating the set of compromised nodes to comprise the preliminary set of edge nodes.

18. The one or more machine-readable media of claim 11, further comprising obtaining a set of labels for nodes of the network, wherein determining the set of compromised nodes comprises determining the set of compromised nodes by providing, as a set of inputs, the sets of event rate gradients and the set of labels to a machine learning model, wherein the machine learning model comprises a gradient boosting machine or a neural network.

19. A method comprising:

obtaining, from an out-of-network data source, an anomaly indication for an event type associated with a set of event participant identifiers indicated by temporal sequences for a network;

generating sets of event rate gradients associated with sets of time blocks based on event rates for events of the event type indicated by the temporal sequences;

determining a set of compromised nodes by:

selecting a set of time blocks for which an associated set of event rate gradients falls below an acceleration threshold to identify a set of candidate compromised nodes;

filtering the set of candidate compromised nodes by a shared geographic identifier to detect a preliminary set of compromised nodes; and determining an expanded time window based on an earliest time block of the set of candidate compromised nodes satisfying an event rate threshold and a geographic-based criteria;

performing a search through the temporal sequences based on the expanded time window and the event type to obtain the set of compromised nodes; and applying a monitoring filter to traffic for the set of compromised nodes, searching additional edge nodes for incidents associated with a geographic region associated with the set of compromised nodes to detect a malicious identifier; and assigning the malicious identifier to the set of compromised nodes in response to detecting the malicious identifier in at least one node of the additional edge nodes;

wherein the expanded time window is greater than or equal to six months.

20. The method of claim 19, wherein generating the sets of event rate gradients comprises:

sampling the set of candidate compromised nodes using a set random values to obtain a set of sampled nodes; and generating the sets of event rate gradients based on sequences associated with the set of sampled nodes.

21. The method of claim 19, further comprising:

obtaining a transaction rate associated with a device category associated with the set of candidate compromised nodes; and determining the event rate threshold based on the transaction rate.

22. The method of claim 19, further comprising:

scoring the set of candidate compromised nodes based on the event rates to determine a first score associated with a first edge node; and adding a second edge node to the set of compromised nodes based on a shared association between a geographic location category and the first edge node.

23. The method of claim 19, wherein obtaining the anomaly indication comprises receiving data from a computer system in communication with both the network and at least one computer that is out-of-network.

24. The method of claim 19, further comprising:

obtaining data from the out-of-network data source identifying a preliminary set of edge nodes; and updating the set of compromised nodes to comprise the preliminary set of edge nodes.

25. The method of claim 19, further comprising obtaining a set of labels for nodes of the network, wherein determining the set of compromised nodes comprises determining the set of compromised nodes by providing, as a set of inputs, the sets of event rate gradients and the set of labels to a machine learning model, wherein the machine learning model comprises a gradient boosting machine or a neural network.

26. The method of claim 19, wherein the acceleration threshold is greater than zero.

* * * * *